H. TAYLOR.
TIRE PUMP.
APPLICATION FILED MAY 10, 1916.
1,198,972.
Patented Sept. 19, 1916.
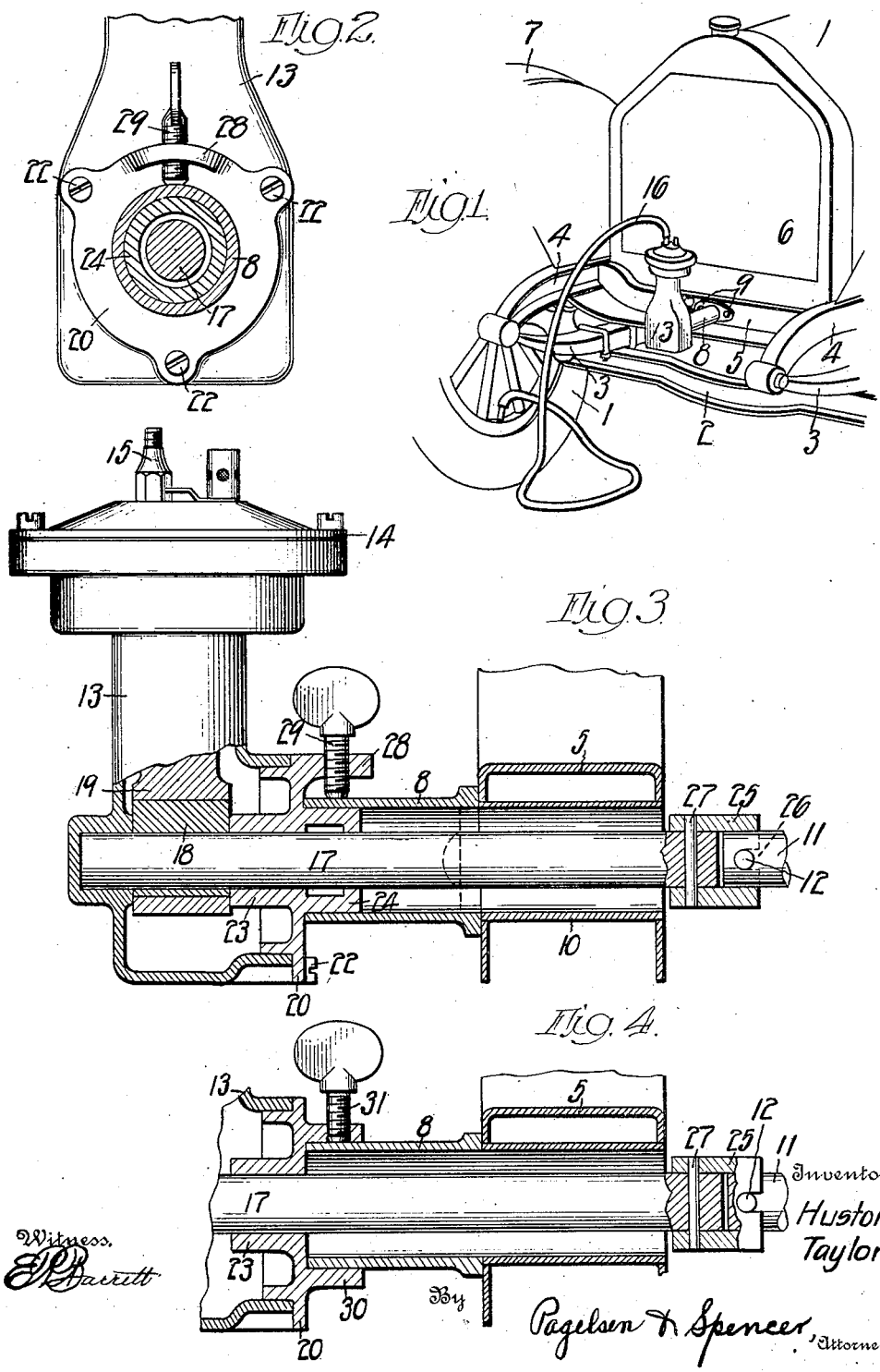
Witness.
E. P. Barrett
Inventor
Huston Taylor,
By Pagelsen & Spencer, Attorneys

UNITED STATES PATENT OFFICE.

HUSTON TAYLOR, OF DETROIT, MICHIGAN.

TIRE-PUMP.

1,198,972.  Specification of Letters Patent.  Patented Sept. 19, 1916.

Original application filed March 31, 1915, Serial No. 18,250. Divided and this application filed May 10, 1916. Serial No. 96,466.

*To all whom it may concern:*

Be it known that I, HUSTON TAYLOR, a citizen of the United States, and residing at Detroit, in the county of Wayne and State of Michigan, have invented a new and Improved Tire-Pump, of which the following is a specification.

This invention relates to devices for temporarily connecting the shafts of small pumps to the crank-shafts of automobile engines, and its object is to provide means for holding the pump body in such relation to the engine support that the engine shaft may drive the pump, and which is so constructed as to permit ready and immediate engagement and disengagement.

This invention consists, in combination with the chassis and the engine shaft of an automobile, of a rigid member on the chassis preferably concentric with the engine shaft, a pump, a shaft therefor, and a screw having its axis at an angle to the axis of the pump shaft for securely holding the pump body on the rigid member.

The present application is a division of my application for patent on tire pump filed March 31, 1915, Serial Number 18,250.

In the accompanying drawings, Figure 1 is a perspective view of the front end of an automobile to which a tire-pump is connected. Fig. 2 is a section on the line 2—2 of Fig. 3. Fig. 3 is a vertical section of the front portion of the chassis and lower portion of the pump, the upper portion of the pump being shown in elevation. Fig. 4 is a similar vertical section showing a modification.

Pumping up automobile tires by hand is usually very hard and tedious work, which may be mechanically performed by the present invention. A small portable pump, which can be carried in the tool box of the automobile, is provided with a connecting device whereby it may be mounted on the front end of the chassis with its shaft connecting to any driven shaft of the engine through the sleeve or tubular member which usually receives the hand-operated cranking device.

Referring to Fig. 1, the wheels 1, the front axle 2, the springs 3, the side bars 4 and the front cross-bar 5 of the chassis, the radiator 6 and the fenders 7 are of any desired construction. Projecting forward from the front cross-bar is a tubular member 8 having lugs 9, so that it can be rigidly connected to the cross-bar.

The cross-bar 5 is pierced to receive a bushing 10 in the vicinity of which the crank-shaft 11 of the engine terminates, and the latter is provided with the usual cross-pin 12 for the application of the starting crank. The engine shaft, the bushing and the member 8 are arranged as nearly in axial alinement with one another as the installation will conveniently allow. The pump may be of any desired construction so long as it has a revoluble driving shaft; in the present case a well known pump of the diaphragm type having a body 13 is shown. In the head 14 of this pump is an intake valve and a discharge connection 15 to which a flexible tube 16 may be connected. In Fig. 1 this tube is shown extending to the air valve of one of the front tires.

In the body 13 is revolubly mounted a shaft 17 having an eccentric 18 which extends through the lower end of the connecting rod 19. A plate 20 may be attached to the body 13 by means of the screws 22 or made integral therewith. A bearing 23 for the shaft 17 may be formed on this plate 20, and a cylindrical collar 24 may extend into the tube 8 on the chassis; this collar is preferably short and allows the shaft 17 to be tilted somewhat in respect to the axis of the member 8 and bushing 10 to bring a coupling sleeve 25 on the inner end of the pump shaft into operative engagement with the pin 12 on the engine shaft. The sleeve may be slotted at 26 to receive the pin 12 and may be rigidly secured to the pump shaft by a cross-pin 27.

Many different devices may be employed to prevent the collar 24 from turning within the member 8. In Fig. 3 I have shown a lug 28 formed on the part 20 and extending outwardly over the member 8, and provided with a thumb-screw 29 to hold the pump-body from turning relative to the chassis. When it is desired to pump up a tire, the small cap usually closing the front end of the member 8 is removed and the shaft 17, the collar 24 and the coupling 25 are inserted until the latter engages the pin 12, as shown in Fig. 3. The thumb-screw 29 is then turned down, the flexible tube 16 connected and the engine started.

Instead of the collar 24 entering the member 8, a collar 30 (preferably short to allow for non-alinement of the parts as before) may be formed on the plate 20, of such size as to fit over the end of the member 8, as shown in Fig. 4, a thumb-screw 31 being employed to lock the collar 30 to the member 8.

The details of construction of this invention may all be changed by those skilled in the art without departing from the spirit of my invention as set forth in the claims.

I claim:—

1. In combination, a support, a driving shaft, a pump body, a pump shaft projecting from the body in substantial alinement with the driving shaft and rotatable with the latter, and a screw carried by said pump body, said screw having its axis in a plane at an angle to the axis of the pump shaft, whereby pressure is exerted to clamp the parts together against rotative movement and against longitudinal movement of the pump body in respect to the driving shaft.

2. A device for mounting a pump on the front end of a motor vehicle with the pump shaft in alinement with and coupled to a motor shaft consisting of substantially concentric members, one on the vehicle and the other on the pump, means to lock these members together against relative longitudinal movement, said means comprising a screw carried by the pump, the axis of the screw being in a plane at substantially right angles to the axis of the motor shaft and on a line passing substantially through said axis.

3. In combination, a support, a driving shaft, a pump body, a pump shaft projecting from the body in substantial alinement with the driving shaft and rotatable with the latter, and a screw having its axis in a plane at an angle to the axis of the pump shaft, whereby pressure is exerted to clamp the parts together against rotative movement and against longitudinal movement of the pump body in respect to the driving shaft.

HUSTON TAYLOR.